Patented June 25, 1935

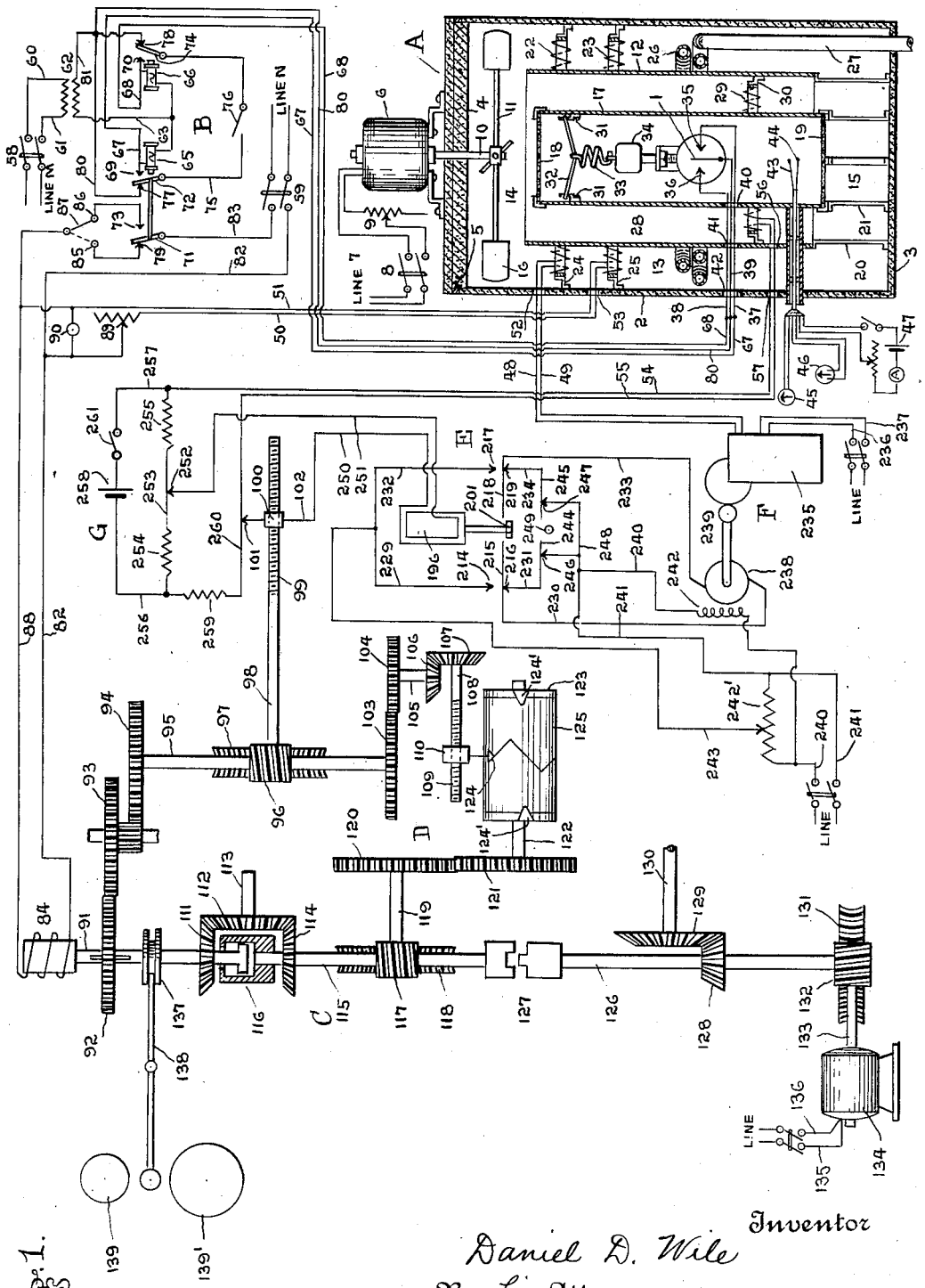

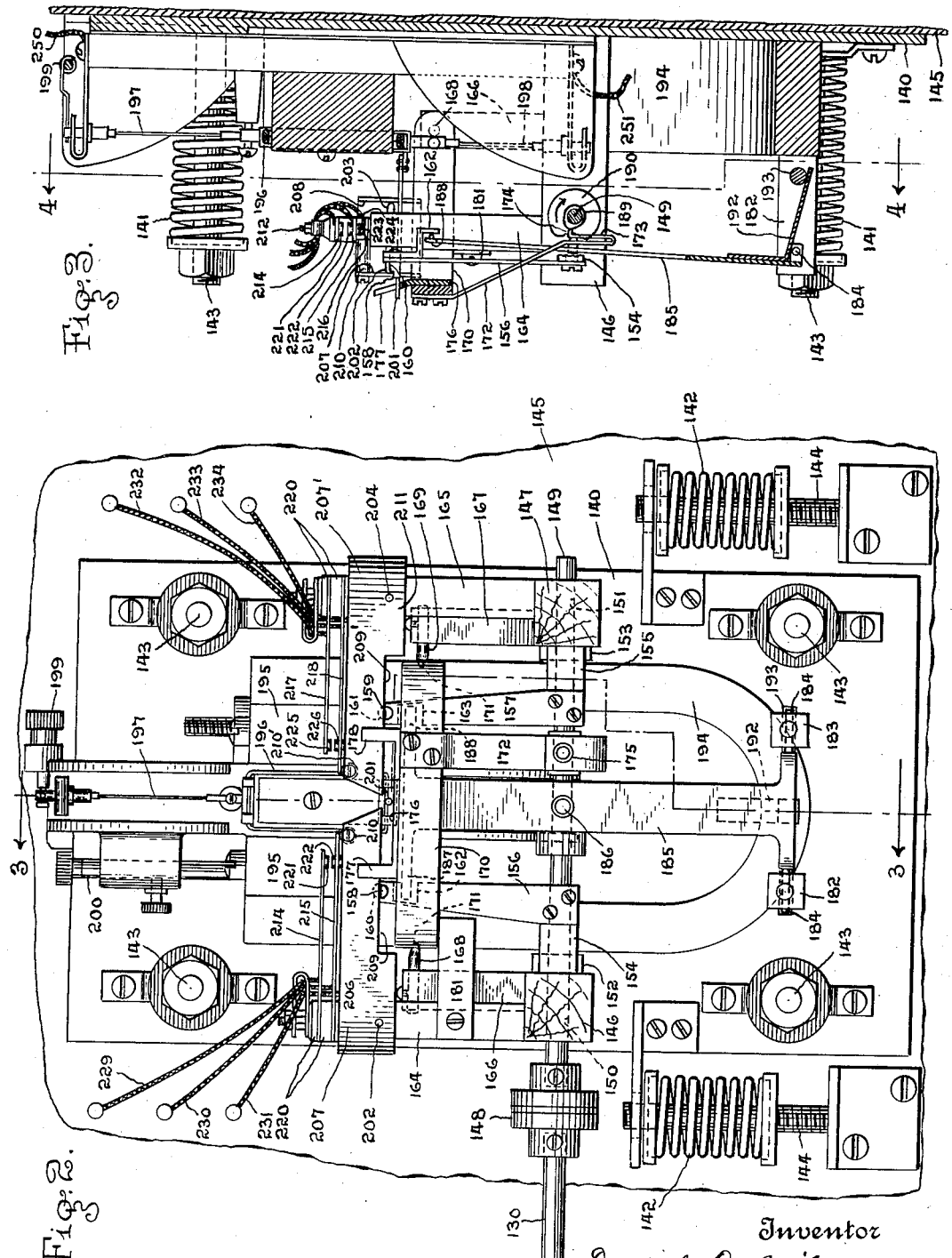

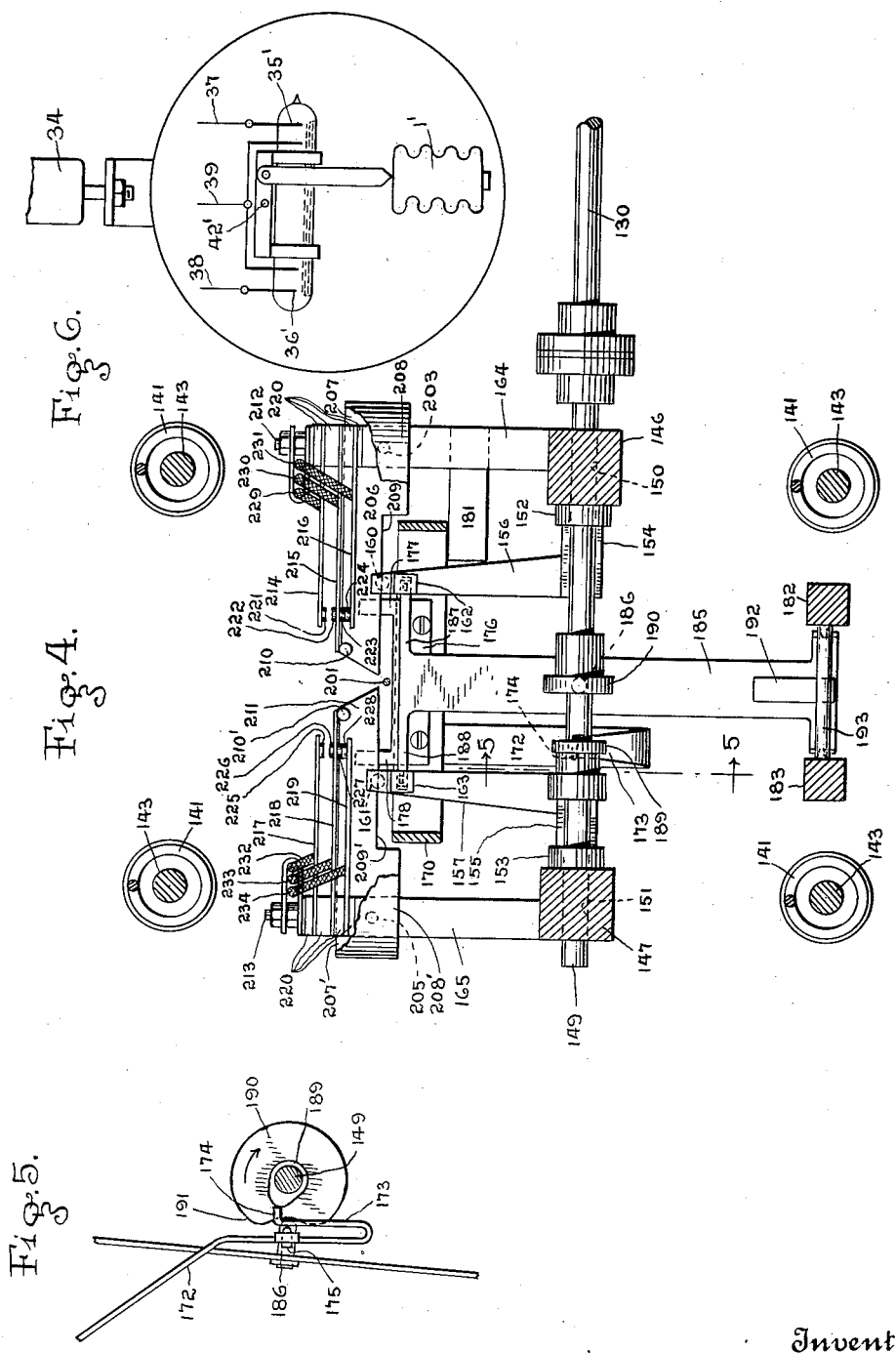

2,006,306

UNITED STATES PATENT OFFICE 2,006,306

APPARATUS AND METHOD FOR TEMPERATURE REGULATION

Daniel D. Wile, Detroit, Mich., assignor to Detroit Lubricator Company, Detroit, Mich., a corporation of Michigan Application May 22, 1930, Serial No. 454,548

35 Claims. (Cl. 236—1)

My invention relates to new and useful improvements in a method of regulating or controlling temperature or sensible heat and an apparatus for carrying out my novel method.

An object of my invention is to provide a method for accurately maintaining a predetermined desired degree of sensible heat.

Another object is to provide a method by which temperature may be varied or changed at a substantially uniform rate, that is, such that temperature change plotted against time will be substantially a straight line curve.

Another object is to provide a method for determining the accuracy of response of thermostatic means to predetermined degrees of sensible heat.

Another object is to provide a method for determining the extent to which the response of thermostatic means lags behind a predetermined point in a range of temperature variation at which the thermostatic means is intended to respond and to which temperature the thermostatic means is subjected.

Another object is to provide an apparatus of simple construction for efficiently carrying out my novel method.

The invention consists in the novel apparatus, the novel structure or parts comprising the apparatus, the novel aggroupment of the parts in cooperable relation, and the novel method effected by means of the apparatus.

In the accompanying drawings, to be taken as a part of this specification, I have fully and clearly illustrated a preferred embodiment of my invention, in which drawings—

Figure 1 is a diagrammatic view of the complete apparatus of my invention and by which my novel method may be performed;

Fig. 2 is a detail view in front elevation of a control means comprising a part of the apparatus;

Fig. 3 is a view in section on the line 3—3 of Fig. 2;

Fig. 4 is a view in section on the line 4—4 of Fig. 3;

Fig. 5 is an enlarged detail view in section on the line 5—5 of Fig. 4, and

Fig. 6 is an enlarged diagrammatic view showing a modification of certain structure of Fig. 1.

Referring to the drawings by characters of reference, A designates a chamber which is insulated and is adapted to contain a temperature responsive or thermostatic means 1 (shown diagrammatically) which controls an electric relay system B. The system B controls through the medium of an electrical and mechanical drive means or system C, a recording means D, and a balancing system E for determining the temperature or degree of sensible heat in the chamber A at any instant in a given period of time. In the system E is a variable resistance or motor operated voltage regulator system F and an electric bridge system G.

The chamber A has rigidly constructed side and bottom walls 2, 3 and a cover or closure member 4 for the upper open end of the chamber A. The walls 2, 3 and member 4 are heat insulated or of heat insulating material such as cork or the like. The cover member 4 is preferably rabbeted at its periphery so as to fit in the chamber opening and rest upon the wall 2, and is also provided with a gasket 5 of soft rubber or the like to effectively seal the joint. Carried rigidly by the member 4 is an electric motor or driving means 6, preferably of the variable speed type, supplied with current from a power line 7 through an electric switch or control means 8 and a rheostat 9 by which the motor speed may be controlled. The shaft 10 of motor 6 extends substantially vertically downward through a close fitting aperture in the member 4 and has fixed on its free end adjacent the inside face of member 4, a fan or stirring means 11 by which the temperature of the atmosphere, preferably air, within the chamber A may be homogenized, and the chamber-contained air may be caused to flow or circulate within the chamber. In the chamber A is a duct member or passage-forming baffle member 12 which is open at its ends and which extends substantially vertically and longitudinally of the chamber in spaced relation to the walls and cover member thereof. The spacing of the member 12 from the walls of the chamber provides a flow passage 13 which opens into transverse spaces 14, 15 above and below member 12, so that the fan blades 16 may be positioned in alinement with passage 13 and so adjusted as to cause flow downward through passage 13. Within the member 12 in laterally spaced relation thereto, is a vertically extending duct or container member 17 which is open at its top and bottom ends, the open ends, however, preferably being covered or overlaid respectively with foraminous members 18, 19, such as screen members of fine wire mesh or the like, the member 18 being removably secured to the member 17. The members 12 and 17 are preferably supported by leg or standard members 20, 21 respectively, which are fixed to the inside face of the bottom wall 3. In the passage 13 and surrounding member 12 are a plurality of vertically spaced heating means 22, 23 for chamber A, which are preferably independent electric resistance heating coils mounted on annular forms and carried respectively by brackets 24, 25 fixed to the inside face of wall 2. Also in passage 13 is a means 26 for withdrawing heat from chamber A and which is preferably positioned below the means 22, 23, the means 26 preferably being a refrigerating coil or the like surrounding member 12 and supplied with cooling medium or refrigerant by means of the pipes or conduits 27, of which but one is shown and which lead into chamber A through tight fitting apertures in the wall 3. The space between members 12 and 17 comprises an upflow passage, designated 28, in which is a temperature responsive means 29, preferably an electric resistance element or coil surrounding member 17. The means 29 is of material having a resistance sensitive to temperature, such as nickel wire or the like. The means 29 is preferably positioned adjacent the lower end of passage 28 and carried by an annular form supported on brackets or the like 30 secured to the inside face of member 12. Within the member 17 at its upper end, are supporting means 31, such as hooks or lugs which are interconnected by a wire or other tie member 32 from which depends a coil spring member 33 carrying a weight member 34 for removably supporting a thermostatic element or member 1 against vibration, and which is to be tested. The member 1 may be part of a complete device which includes electric switch means having electric contact means 35, 36, contact being made and broken by member 1, or the member 1 may be separate from the contact means 35, 36. If the member 1 is separate from the contact means 35, 36, then the means 35, 36 will be a part of the chamber A with the member 1 alone being inserted in chamber A for test in electrical and mechanical cooperative relation to the means 35, 36. Extending from the contact means or members 35, 36 and from member 1, are lead wires 37, 38 and 39 respectively, which pass through tight fitting alined apertures 40, 41 and 42 in member 17, member 12 and wall 2, respectively. Certain thermostatic switch devices do not employ the thermostatic member 1 as an electric conductor, but merely as a contact actuating means (see Fig. 6), wherein the member is shown as an expansive fluid charged, expansible-collapsible, resilient, metallic element or bellows 1' which acts through linkage to rock or tilt a mercury contact tube about its pivot 42' to make or break the circuit between leads 39 and 37, or between leads 39 and 38 at the contacts 35', 36' respectively. The primes of reference characters applied to Fig. 1 being used as the characters designate similar parts. Positioned within the member 17 are means 43, 44 for measuring temperature and velocity of air flow respectively, and which are preferably a thermocouple having a temperature indicating mechanism 45 and an anemometer such as that described and claimed in my copending application, Serial No. 415,259, filed December 19, 1929, and having a velocity indicating mechanism 46 and a regulatable source of electromotive force, 47. From the coil 22 extend conducting wires or leads 48, 49, and from the coil 23 extend leads 50, 51, which pairs of leads pass respectively through tight fitting apertures 52, 53 in the wall 2, and from coil 29 extend leads 54, 55, which last pair passes through tight fitting apertures 56, 57 in the duct member 12 and the wall 2 respectively. The leads 48, 49 connect with the variable resistance means or motor operated voltage regulator F and thence to line, while the leads 50, 51 connect with the relay system B and thence to line, and the leads 54, 55 connect into the bridge system G.

The relay system B may be supplied with current from a common source at the points designated "Line M" and "Line N", or if desired, under certain conditions may be supplied at such points from different sources. In the lines M and N are control switches 58, 59 respectively, the leads 60, 61 from switch 58 being connected to the primary of a transformer 62. From the transformer secondary, a lead 63 extends to the windings, in parallel, of relay magnets 65, 66. From the windings extend leads 67, 68 connected to contacts 69, 70 respectively, and which are electrically connected, respectively, to the leads 37, 38 from chamber A. The magnet 65, when energized, acts to attract the interconnected insulated blades 71, 72 of a double-pole, double-throw switch and to make contact between blade 72 and contact 69, while blade 71 is moved into contact with a lead terminal or contact 73. The magnet 66, when energized, acts to make contact between a switch blade 74 and the contact 70. The blades 72 and 74 are connected by a lead wire 75 in which is a control switch 76, preferably manual. The blades 71 and 72 and blade 74, upon deenergization of magnets 65, 66, move to open position by gravity, by spring force, or by a combination of the two, as is well known in electric switch practice. Preferably in opposed relation to the contacts 69, 70 and 73 are contacts 77, 78 and 79 respectively, with which the blades 72, 74 and 71 contact when the magnets 65, 66 are deenergized. From the contact 77 extends a lead 80 which is electrically connected to the lead 39 from chamber A, while the contact 78 is connected by a lead 81 which is connected to lead 80 and to the opposite side from lead 63 of the transformer secondary. From the switch 59 extend leads 82, 83, the lead 83 being connected to the switch blade 71, and the lead 82 being connected to he winding of a solenoid 84, having a function to be described. The contacts 79, 73 with which the blade 71 cooperates are connected by leads to contacts 85, 86 respectively of a manual switch having a switch blade 87 which is electrically connected by a lead 88 to the winding of solenoid 84 to complete the circuit therethrough. The leads 50, 51 from heater coil 23 connect to the leads 82, 88 respectively. In the lead 50 is a rheostat or variable resistance means 89, and connected across the leads 50, 51 is an electric signal lamp 90 which will indicate when current is "on" or "off" in the circuit.

The core 91 of the solenoid 84 is rotatable and forms a part of the drive system C, which will now be described. On the core 91 which serves as a driven shaft is splined or keyed, for movement axially of the shaft, a gear wheel 92 which meshes with a compound reducing gear wheel 93 in mesh with a gear wheel 94 fixed on a shaft 95. Intermediate the ends of shaft 95 is fixed a worm wheel 96 in mesh with a worm gear wheel 97 fixed on a substantially horizontal shaft 98 which is screw-threaded, as at 99, and carries a nut member 100 held by any suitable means against rotation so that rotation of shaft 98 will cause axial travel of the member 100 therealong. Mounted on the member 100 is an electric contact 101 insulated from shaft 98, from which extends a flexible electric lead 102 to permit free travel of member 100 and which comprises a part of the bridge system G to be described.

The shaft 95 serves to drive a part of the recording system D, and has fixed thereon a gear wheel 103 in mesh with a gear wheel 104 on a shaft 105 which has fixed thereon a bevel gear wheel 106 in mesh with a bevel gear wheel 107 fixed on a shaft 108. The shaft 108 which is preferably substantially horizontal, is screw-threaded, as at 109, and carries a nut member 110, for a purpose to be described, which is suitably fixed against rotation so as to compel travel thereof axially of shaft 108 as the shaft is rotated. Fixed on the shaft 91 is a bevel gear wheel 111 which is movable into and out of engagement with a bevel gear wheel 112 on a stub shaft 113, and which is in mesh with a bevel gear wheel 114 fixed on a shaft 115 alined with shaft 91. Between the gear wheels 111 and 114 is a clutch means 116, such that the clutch is disengaged or "thrown out" when the gear wheels 111 and 112 are in mesh and is in engagement for direct drive between shafts 115 and 91 when the gear wheels 111 and 112 are out of mesh. It is thus apparent that the clutch means 116 which may be of any suitable and desirable type, serves to permit reversal of rotation of shaft 91 upon energization and deenergization of solenoid 84, and consequently to cause each of the nut members 100 and 110 to reverse in direction of travel along their respective shafts. Intermediate the ends of shaft 115 is a worm wheel 117 in mesh with a worm gear wheel 118 fixed on a shaft 119 carrying a gear wheel 120 which meshes with a gear wheel 121 on a shaft 122 to rotate a drum 123. The shafts 109 and 122 are preferably substantially parallel and adjacent so that a reservoir inking pen or other marking means 124 carried by the member 110 may have overlying engaging relation with the drum 123 and be moved longitudinally thereof by the travel of member 110. The drum 123 preferably has clip means or the like 124' by which a recording chart or sheet 125 may be removably mounted on the circumference thereof. The shaft 115 may be engaged with or disengaged from an alined shaft 126 by means of a manually operable clutch 127 of any known type having its cooperable parts respectively fixed to shafts 115 and 126. On the shaft 126 is a bevel gear wheel 128 which meshes with a bevel gear wheel 129 rigid on a substantially horizontal shaft 130 which drives certain elements of the balancing system E, to be described. Also on the shaft 126 is a worm gear wheel 131 which is in mesh with a worm wheel 132 fixed on the shaft 133 of a constant speed electric motor 134, or other constant speed prime mover, having a current supply from the line through switch controlled motor leads 135, 136. A collar 137 or the like may be fixed on shaft 91 in operative engagement with one end of a pivoted bell clapper lever member 138, which at its free end extends between differently pitched gongs 139, 139', so that the striking of the gongs by the member 138 will give audible and different signals of the reversal of rotation of shaft 91. It may be noted that each of the shafts above defined, is in practice provided with suitable supporting and bearing or journal means, not shown, as the disclosure of Fig. 1 is diagrammatic.

The shaft 130, as above noted, serves to actuate certain of the elements of the system E, which comprises the following structure: Referring particularly to Figs. 2, 3, 4 and 5; 140 designates a vertically positioned back or base board or supporting member which is universally resiliently mounted by means of horizontal and vertical coil springs or the like 141, 142, clamped to the member 140 and supported on horizontal and vertical studs 143, 144, respectively, rigid with a main supporting panel member 145. Extending forward substantially at right angles to the base member 140, are horizontally spaced supporting arm or bar members 146, 147 which are in the horizontal axial line of the shaft 130. Secured to the shaft 130 by a flexible coupling 148 or the like, is a shaft extension 149 which is journaled in bearing apertures 150, 151 in the members 146, 147, respectively. Collars 152, 153 fixed on shaft 149 between members 146, 147 maintain the shaft against endwise play. Extending in opposed relation toward each other from the members 146, 147, are substantially horizontal supporting members 154, 155 respectively, to the front face of which are secured resilient, upwardly extending stop or limiting members 156, 157, preferably leaf springs, having at their upper ends forward extending pins or lugs having on their upper sides supporting steps or portions 158, 159, and holding or locking portions 160, 161 positioned rearwardly of the portions 158, 159 and adjacent the front faces of members 156, 157. On the rear faces of members 156, 157 adjacent their tops, are depending hook or lug members 162, 163. Rising from each member 146, 147 are front and rear post members 164, 165, and 166, 167. Pivotally supported or fulcrumed on opposed pins or pintles 168, 169, adjustably fixed in the rear post members 166, 167, respectively, is an oscillatable member 170, which extends forwardly of post members 164, 165 and which is movable up and down or substantially vertically, and is preferably of substantially U-shaped formation having alined bearing recesses 171 in its rearwardly extending leg extremities which receive the pins 168, 169. Fixed rigidly to and depending at a rearward inclination from the leg connecting or base portion of member 170, is an arm or member 172 (see Fig. 5). The lower end of member 172 extends, as at 173, rearwardly and upwardly upon itself and then substantially horizontally rearwardly to provide a cam engaging portion or member 174 in line with shaft 149. Threadedly engaged in an aperture in member 172, is an adjustment screw 175 which at its inner end abuts the upturned part 173. Also fixed rigidly to the base portion of member 170, is a bracket member 176 having spaced, upstanding stop arms or fingers 177, 178, for a purpose to be described, and which project above the plane of the base portion. Secured to the front post member 164 is an adjustable stop member 181 which extends beneath member 170 for limiting the downward movement thereof. Extending forward from the base member 140 beneath members 164, 165 are substantially horizontal spaced supporting bars or members 182, 183 having opposed bearing pins 184 substantially vertically beneath the members 154, 155 (see Fig. 3). Journaled between or pivoted on the pins 184, is an oscillatable, upwardly extending member 185 movable fore and aft at its upper end in a substantially horizontal plane. Substantially in the horizontal plane of shaft 149 is a cam engaging or pin member 186 adjustably secured to and carried by the member 185. At its upper end the member 185 terminates substantially in the horizontal and vertical plane of the hook members 162, 163, above described, and has laterally extending arm portions 187, 188 which extend respectively between the member 156 and hook member 162, and between the member 157 and the hook member 163, so that rearward movement of member 185 will flex the members 156, 157 from their normal, substantially vertical positions by engagement of arm portions 187, 188 with hook members 162, 163, respectively. On the shaft 149 are adjustably fixed cams 189, 190 which cooperate respectively with the members 174, 186. The cam 190 is substantially cylindrical and has a concave recess 191 in its periphery into which the member 186 rides under the force of a spring means 192 which is more powerful than the leaf springs 156, 157 and extends between the member 185 and the member 140. The means 192 is preferably a leaf spring fixed to member 185 and which engages the underside of a rod or bar 193 joining the supporting bars 182, 183. Fixed to the base member 140 between the supporting members 146, 147 and resting upon the members 182, 183, is a magnet 194 of a galvanometer or other instrument which is sensitive to current flow and may be of any standard construction having pole pieces 195 between which is positioned an oscillatable coil 196 adjustably suspended by and between vertical electric conductors 197, 198, and having coil adjustment means 199, 200, as is well known in the art. The coil 196 has secured thereto a forwardly projecting oscillating means or needle 201 which terminates forward of the bracket 176 and is movable in a substantially horizontal plane between the stop fingers or means 177, 178, and normally just sufficiently above the bracket to swing freely clear thereof. The needle 201 is also vertically movable within limits permitted by the resilience of the conductors 197, 198, for a purpose to be described. Adjacent the tops of the post members 164, 165 are alined forwardly and rearwardly projecting, substantially horizontal bearing or pivot pins 202, 203 and 204, 205. Pivoted or fulcrumed on the pins 202, 203, is a lever or operating means 206 having a U or hook-shaped end to provide opposed bearing surfaces 207, 208 respectively, having alined bearing sockets or apertures to receive the pins 202, 203. The lever 206 normally extends substantially horizontally toward the needle 201, terminating just short of the same, which extends forwardly therebeyond, and so as to permit free vertical movement or lift of the needle 201 when the needle is in normal central position without the needle engaging the lever 206. The underside of the lever 206 is preferably recessed, as at 209, to provide a supporting face which normally rests upon the pin portion 158 of the rearwardly flexed limiting member 156, at such a height that the needle 201 will just pass freely under the lever 206. Secured to the lever 206 adjacent its top and free inner end, is a pin or projecting member 210 of insulating material or insulated from the lever 206. Pivoted or fulcrumed on post member pins 204, 205, is a lever or operating member 211 which is similar to lever 206, except that it is the reverse thereof, and therefore the primes of the characters applied to lever 206 designate similar parts of the lever 211. Rising from the top faces of the post members 164, 165 are screw studs or the like 212, 213 which respectively support a plurality of superposed contact members 214, 215, 216 and 217, 218, 219, which are resilient, as leaf springs, for vertical flexing. The contact members are insulated from each other and from the post members 164, 165 by insulating blocks or the like 220 mounted on the studs 212, 213. The intermediate contact members 215, 218 are longer than the others of their groups and extend over and in substantial engagement respectively with the insulated lever pin members 210, 210', so that upward movement of levers 206, 211 will lift the contact members 215, 218 respectively. Suitable cooperable contact points or buttons secured to the contact members are provided, as follows: On members 214, 215 are points 221, 222; on members 215, 216 are points 223, 224; on members 217, 218 are points 225, 226, and on members 218, 219 are points 227, 228. The points or buttons 223, 224 and 227, 228 are normally in engagement and so held by the resilience of their contact members. From the members 214, 215, 216, 217, 218 and 219 respectively, extend electric leads or conductors 229, 230, 231, 232, 233 and 234, all of which connect to the system F.

A motor operated induction voltage regulator 235 (see Fig. 1) is preferably employed in the system F, the regulator being fed from the line by switch controlled conductors 236, 237. The leads 48, 49 from coil 22 connect to the regulator 235 so that the current supplied to the coil 22 from conductors 236, 237 is automatically controlled. The regulator 235 is driven by a motor 238 connected thereto by shafts and gearing 239 or the like. The leads 230, 233 from the contact members 215, 218 are connected to the terminals of the motor 238, and are supplied with current through switch controlled leads from the line, as 240, 241, which are connected together and which have in their circuit the field coil 242 of motor 238. A variable resistance 242' is connected across the leads 240, 241, and from the movable contact thereof extends a lead 243 which joins and is common to the leads 229, 232. The leads 231, 234 are connected to contact arms 244, 245 of a safety device of any known construction, which is controlled by and controls the regulator 235, for example, as follows: The arms 244, 245 normally engage contact points 246, 247 which are interconnected by a lead 248 which joins the circuit 240, 241. The arms 244, 245 are separately movable out of contact with their contacts 246, 247 by a finger or projecting member 249 actuated by the principal moving part of the regulator 235, so that member 249 will operate arms 244, 245 to break the contact thereof with their points 246, 247 before a dangerous limit of movement has been reached by the regulator 235.

The electric bridge system G controls, through leads 250, 251 which are connected to the coil supporting conductors 197, 198 respectively, the system F by actuating the movable coil 196, as will be described. The lead 250 joins the flexible lead 102 of the movable contact 101, whereas the lead 251 is connected to the movable contact 252 of a variable resistance member 253 which is electrically positioned between fixed resistance members 254, 255, which at their opposite ends are connected by leads 256, 257 respectively, to a battery current supply 258, or other source of electromotive force. The contact 252 is manually adjustable to provide means for varying the ratio of the resistance values of members 253, 254 and 255 to the right and left of point 252, so that the range of temperature within chamber A may be varied independently of the contact 101 and resistance member 260. The temperature responsive resistance member 29 positioned in chamber A is in series circuit by means of leads 54, 55 with a fixed resistance member 259 and an adjustable resistance member 260, which is electrically positioned between the resistance members 29 and 259. The resistance members 29, 260 and 259 are in parallel circuit with resistance members 253, 254 and 255, the free ends of resistance members 29 and 259 being connected to the battery supply leads 257, 256 respectively. The contact 101 engages or electrically contacts the resistance member 260 and is movable therealong upon rotation of the threaded shaft 98 to determine the resistance of resistance member 29 which will balance the bridge system G and thereby prevent flow of current through the galvanometer coil 196 and maintain the needle 201 stationary in normal central position. It may be noted, as is well known to those skilled in the art, that all of the resistance members in the bridge system G, except the resistance member 29, are insensitive to temperature, and preferably of material such as manganin.

I will now proceed to describe my method as carried out by the above defined apparatus, it being understood that the following example is merely illustrative of a particular use performed by my apparatus—namely, the testing of thermostatic means—and that the method of maintaining or regulating sensible heat embodied in the testing method is applicable to other uses, such, for example, as in heat treating or annealing processes at either high or low temperature, in chemical or drying processes where a uniform temperature or temperature change is desired, and in the cooling of large brittle masses, as glass, wherein it is imperative that the rate of cooling be slow and constant or uniform. A thermostatic means 1 is positioned in chamber A on the vibrationless supporting member 34, and if means 1 is a thermostatic electric conducting element, then means 1 will be connected to lead 39, while if means 1 does not function as an electric conducting element, then a mechanical and electrical arrangement such as diagrammatically shown in Fig. 6 would be employed, wherein the means 1' is solely a mechanical means for actuating the switch tube, one of each pair of the contacts of which are connected in common to lead 39, while the remaining contacts 35', 36' of each pair are connected to the leads 37, 38 respectively. The screen member 18 is positioned on member 17 and the cover member 4 is replaced to seal the chamber A. The flow of refrigerant through coils 26 is started, the parts of clutch 127 are engaged, the fan motor switch 8 is closed, as are the line switches 58, 59, 76, the bridge circuit switch 261, and the switches controlling line leads 135 and 136, 236 and 237 and 240 and 241, the switch 87 being in the full line position of Fig. 1. The anemometer circuit is closed and the fan motor is adjusted by the rheostat 9 to provide the desired constant rate of air flow through the container 17 and over the means 1, as indicated by the anemometer indicating means 46. The refrigerating effect produced in chamber A by the coils 26, is preferably sufficient to withdraw heat from chamber A at a rate greater than one-half the rate at which heat is supplied by the resistance coil 23 in order to allow for non-uniformity in the refrigerating effect. The heater 23 is controlled by the rheostat 89 to supply heat to chamber A at a rate substantially equal to twice the desired predetermined rate of change of sensible heat in the chamber A. The heat supplied and withdrawn by means 23 and 26, respectively, will vary, due to non-uniformity of current from the line N and variation of refrigerant supply. Even though the means 23 and 26 could be held at a predetermined constant value, the temperature within the chamber A could not be held constant, due to heat leakage from the chamber A to surrounding atmosphere. In order to maintain a constant desired predetermined temperature, or a constant rate of change either by constant increments or constant decrements, the heater 22 is provided in chamber A. This resistance coil 22 controls and is controlled by the sensible heat or temperature of chamber A and supplies heat at a rate sufficient to make up for the heat withdrawn by means 26 in excess of one-half the heat supplied by means 23, and also to make up for losses to atmosphere from chamber A. By supplying heat to and withdrawing heat from the chamber A in the amounts or at the rates stated, I am enabled to provide a constant decreasing rate of change of temperature in chamber A by merely cutting off the current supply to heating coil 23, which is automatically accomplished by the relay system B, and which occurs when switch blade 71 is in the position of Fig. 1.

When the thermostatic means 1 or 1' is temperature satisfied, or has moved to a high limit for which it is set or adjusted, and makes or causes contact between lead 39 and contact point 35, current will flow from the secondary of transformer 62 through leads 81, 80 and 39 to thermostatic electric conducting means 1 of Fig. 1, or to the mercury in the rockable tube of Fig. 6, thence to contact point 35, leads 37 and 67 to and through the winding of relay magnet 65 and through lead 63 back to the transformer secondary. Current flow through magnet 65 will attract blades 71, 72, making contact between blades 71, 72 and points 73, 69, respectively, to maintain current flow through magnet 65, irrespective of movement of means 1 or 1' and until contact is made between lead 39 and point 36, either by means 1 or the mercury in the tube of Fig. 6, due to the following circuit: Transformer 62, lead 81, contact point 78, blade 74, conductor 75 and switch 76, blade 72, contact 69, lead 67, magnet 65, and lead 63 back to the transformer 62. The making of contact between blade 71 and point 73 completes the circuit through solenoid 84, which lifts shaft 91, sounding signal gong 139', disengaging bevel gear wheels 111 and 112 and engaging or throwing in clutch 116 to directly connect motor driven shaft 115 and shaft 91 thereby to reverse the rotation of shafts 91, 95 and 98 and cause nut member 100 and its contact point 101 to move toward the left of Fig. 1 at a constant rate under the driving force of motor 134. Reversal of rotation of shaft 95 will reverse the rotation of shafts 106 and 108, to reverse, simultaneously with the reversal of travel of member 100, the direction of travel of nut member 110 and its marking means 124, while the direction of rotation of drum 123 remains unchanged, it being on the motor side of clutch 116. The temperature responsive resistance member 29 is in series circuit with the variable resistance member 260, and these resistance members 29 and 260 comprise a resistance unit which automatically tends to, or does, maintain itself at any given instant in a period of time at a predetermined constant resistance value, such that the sum of the resistance values of member 254 and the part of member 253 to the left of contact point 252 facing Fig. 1, is to the sum of the resistance values of member 255 and the part of member 253 to the right of contact point 252 facing Fig. 1 as the sum of the resistance values of member 259 and the part of member 260 to the left of contact point 101 facing Fig. 1 is to the sum of the resistance values of member 29 and the part of member 260 to the right of point 101 when facing Fig. 1. The change by constant increments or decrements of the resistance values of the parts of member 260 to the left and right of point 101 caused by the rotation of shaft 98 and consequent travel of member 100 to the left or right of Fig. 1, normally tends to throw the system G out of balance; but if the temperature within chamber A is changing at the desired predetermined rate of increase or decrease, then the variation in the resistance value of member 29 will be the exact complement of the variation in resistance value of member 260 and the system G will be accurately in balance. The bridge system G is of the Wheatstone type, and therefore when the same is balanced, there will not be any current flow through leads 250, 251 and the coil 196, so that the needle 201 will remain stationary in normal central position between the ends of the spaced levers 206, 211. The motor 134 rotates shafts 126 and 130 through gearing, above described, at a constant speed. The rotating shaft 130 continuously rotates the cams 189, 190 clockwise of Fig. 3, the cams 189, 190 cooperating with the cam engaging members 174, 186 respectively to intermittently actuate the members 170 and 185 respectively. The cams 189, 190 are so set relative to each other that as pin 186 moves, under the force of spring means 192, into recess 191, and means 192 oscillates member 185 rearwardly or from the left to right of Fig. 3, the point or projection on cam 189 will engage projection 174 of the member 170 to lift or oscillate the same clockwise of Fig. 3 about its fulcrum points 168, 169. The rearward movement of member 185 acts through arms 187, 188 and hook members 162, 163 to flex latch members 156, 157 rearwardly, if they are not already in such position, so that step pin portions 158, 159 come directly beneath the levers 206, 211 respectively. As the member 170 lifts, the bracket member 176 engages the underside of needle 201, lifting the same above the lower edge of levers 206, 211 and sufficiently to carry either contact point 222 or 224 into engagement with its cooperating contact point 221 or 223 respectively, should the needle 201 be positioned under one or the other of levers 206, 211 respectively. However, as above noted, if the system G remains in balance, needle 201 will not be moved by coil 196, contact will normally be maintained between points 223 and 224 of contact members 215, 216, and points 227, 228 of members 218, 219, which short circuits the motor 238 so that the regulator 235 does not vary the current supply to heating coil 22. Even under ideal conditions, however, there will probably be a variation of temperature within the chamber A. Any variation which may occur will, however, be automatically and instantly corrected for by the action of the resistance member 29. Should the temperature of chamber A be other than of the desired predetermined degree, the resistance value of member 29 will fail to complement the resistance value of the part of member 260 to the right of contact point 101. When such a discrepancy in the proper balancing resistance value occurs, the forward end of needle 201 will be deflected or moved toward the right or left facing Figs. 1 and 2. If, for example, a deficiency of sensible heat below the desired predetermined degree occurs in chamber A, causing swing of the needle 201 to the right, then as member 170 is lifted, it will engage needle 201 and acting therethrough lift the lever 211, breaking contact between points 227, 228 of members 218, 219, and making contact between points 225, 226 of members 217, 218. As lever 211 is lifted off of step portion 159 by cam 189, pin 186 will move into cam recess 191 and spring 192 will move member 185 rearwardly without substantially affecting the positions of members 156, 157, they being held in rear position by engagement of the shoulders on step portions 158, 159 against the rear faces of levers 206, 211. The nose or projection on cam 189 is designed to hold member 170 in maximum raised position until pin 186 rides out of recess 191, so that member 185 releases latch members 156, 157 to permit the inherent resilience of member 157 to carry itself forward to position the latching or locking portion 161 beneath the lever 211 to hold the contact points 225, 226 in engagement during the time when cam 189 permits member 170 and needle 201 to drop back to normal position and until the cam pin 186 again moves into recess 191; but just before pin 186 again enters recess 191, member 170 and needle 201, provided needle 201 is still deflected, will be lifted by cam 189 to hold lever 211 in its raised position until pin 186 again travels through the cam recess 191. However, if needle 201 has returned to normal central position, then needle 201 will be lifted freely between levers 206, 211 as member 157 is moved rearwardly, so that as step portion 159 comes beneath lever 211, the lever will drop down onto portion 159, thus breaking contact at 225, 226 to short circuit motor 238 as contacts 227, 228 again engage each other. When the contacts 225, 226 are closed, current will flow to the armature of motor 238, as follows: From the line through lead 240, resistance means 242', leads 243 and 232 to the engaged contact members 217, 218, lead 233, the motor armature, lead 230, normally closed contact members 215, 216, lead 231, arm 244, contact 246, and leads 248, 241, back to the line. The energization of motor 238 will operate regulator 235 through gearing 239 to cause an increased current flow to resistance member 22, which will increase the rate at which heat is supplied to chamber A. As soon as the deficiency in heat is made up, the bridge system G will be balanced, returning needle 201 to normal central position, so that cam 190 on moving the holding means 161 rearward, will release or unlock lever 211, as above noted. Should the temperature or degree of sensible heat in chamber A become greater than the desired predetermined degree at any instant in a given period of time, then the resistance member 29 will throw the system G out of balance in the opposite direction, deflecting the needle 201 to the left of Fig. 1, so that member 170 when lifted by cam 189, will act through needle 201 to lift lever 201 to break circuit at points 223, 224 and make circuit at points 221, 222, which change in contacts results in energization of the motor 238 to operate regulator 235 to decrease current flow to coil 22 and thereby bring the temperature in chamber A back to the desired predetermined degree. The circuit traversed by the current when needle 201 is deflected to the left on an excess of sensible heat in chamber A, is symmetrical to that when the needle 201 is deflected to the right and is obvious from the description of the apparatus, and from the above defined paths of current flow and the operation of the parts when needle 201 is deflected to the right.

The method carried out by means of the apparatus when the means 1 or 1' is calling for temperature increase or has reached its low limit and makes or causes contact between lead 39 and point 36, is substantially the same as above set forth when contact is made between lead 39 and contact 35, save that the current flow through the relay system B is somewhat different and circuit is broken through relay magnet 65 by energization of magnet 66 attracting blade 74 to break contact at 74, 78, which releases blades 71 and 72 and breaks contact 71, 73 deenergizing solenoid 84 which results in engagement of gears 111, 112 and the reversal of travel of contact 101 and marking means 124. The current flow upon energization of magnet 66 and deenergization of magnet 65, is as follows: From line M through transformer 62, lead 63, relay magnet 66, leads 68 and 38, contact 36, means 1 and leads 39, 80 and 81 back to the transformer. Energization of magnet 68 attracts blade 74, making circuit between contact point 70 and blade 74, so that the magnet 66 serves to maintain the following circuit and prevent change of position of the released blades 71, 72, irrespective of any movement of members 1 or 1' short of engagement between lead 39 and contact 35: From the transformer 62, through lead 63, magnet 66, lead 68, point 70, blade 74, conductor 75 and switch 76, blade 72, contact 77 and leads 80 and 81 back to the transformer.

Should it be desired to employ my method with a member 1 or 1' operating to make and break circuit between a single contact and lead 39, then the switch 76 is opened, cutting out the magnet 66 so that the lead 39 and contacts 35 or 35' are alone used. Irrespective of whether the type of member is that designated 1 or 1', which is operatively positioned in chamber A, the operation of the apparatus will be as above described for closing of contact between leads 37 and 39. However, it may be noted that with switch 76 open, magnet 65 will not act to hold blades 71, 72 in engagement with contacts 73, 69, respectively, but there will be a reversal from increasing to decreasing temperature, or vice versa, in chamber A as soon as circuit is made or broken between leads 37 and 39.

When the apparatus is to be employed to perform my method for testing thermostatic elements or means which operate on a decreasing temperature, such as those for use in controlling refrigeration, or the like, the switch blade 87 is thrown to make contact with terminal 85, as shown in dotted line position, Fig. 1, which, as is apparent, merely reverses the action of the solenoid 84 and the structure controlled thereby.

The marking means 124, which as above noted, cooperates with drum 123, serves to record on the chart 125 the rate of temperature change and the points in the range of temperature in chamber A at which the means 1 or 1' responds.

Any desired constant degree of temperature may be accurately maintained in chamber A, by regulating the position of contact 101 along the resistance member 260 and then disengaging the clutch 127 so that contact 101 will remain fixed in predetermined position. As above noted, the throwing out or disengaging of the parts of clutch 127 does not prevent functioning of the balancing system E, as the shaft 130 is on the motor side of the clutch.

The rate of change of temperature in chamber A may be made to vary by any desired increments or decrements, by substituting for the gear wheel 93 other compound gears of different ratio so as to either increase or decrease the speed of rotation of shaft 95 and the shafts driven thereby.

It may be noted and will be readily understood, that my apparatus may be employed to maintain a predetermined desired temperature difference between two compartments or chambers by merely substituting for the insensitive resistance member 259 a temperature sensitive resistance member similar to member 29. The temperature responsive resistance member which is substituted for member 259 would be positioned in one of the chambers or compartments, while the member 29 would be positioned in the other of the chambers or compartments, so that instead of maintaining a predetermined desired degree of temperature at any instant in a given period of time about the member 29, I am enabled to maintain about the member 29 a degree of temperature which differs by a predetermined amount from the degree of temperature about the member substituted for insensitive resistance member 259.

What I claim and desire to secure by Letters Patent of the United States is:—

1. An apparatus of the character described, comprising a chamber, regulatable heating means in said chamber, cooling means in said chamber acting to withdraw heat from said chamber simultaneously with the supply of heat to said chamber by said heating means, and means to regulate the heat supplied by said heating means in predetermined relation to the rate at which heat is withdrawn by said cooling means whereby the temperature of said chamber may be accurately controlled.

2. An apparatus of the character described, comprising a chamber, regulatable heating means in said chamber, cooling means in said chamber, acting to withdraw heat from said chamber simultaneously with the supply of heat to said chamber by said heating means, means to homogenize the temperature in the chamber, and means to regulate the heat supplied by said heating means in predetermined relation to the rate at which heat is withdrawn by said cooling means whereby the temperature of said chamber may be accurately controlled.

3. An apparatus of the character described, comprising a chamber, a plurality of heating means in said chamber, cooling means in said chamber acting to withdraw heat from said chamber simultaneously with the supply of heat to said chamber by said heating means, and means to vary the rate of heat input by certain of said heating means in predetermined relation to the heat loss from said chamber and to the rate of heat withdrawal by said cooling means whereby the temperature of said chamber may be accurately controlled.

4. An apparatus of the character described, comprising a chamber, heating means for said chamber, cooling means for said chamber, and a balancing system responsive to sensible heat in said chamber and controlling the rate of heat input by said heating means in predetermined relation to the rate at which heat is withdrawn by said cooling means whereby the temperature of said chamber may be accurately controlled.

5. An apparatus of the character described, comprising a chamber, regulatable heating means for said chamber, cooling means for said chamber acting simultaneously with said heating means to withdraw heat from said chamber at a substantially constant rate, an electric balancing system operatively connected to and for regulating the heat supplied by said heating means in predetermined relation to the rate of heat loss and the rate at which heat is withdrawn by said cooling means, said system including means establishing the predetermined degree of sensible heat desired in said chamber at any instant in a given period of time and including means responsive to the temperature in said chamber and cooperable with the establishing means whereby said system acts to correct for any variation in actual sensible heat from the predetermined desired degree of sensible heat.

6. An apparatus of the character described, comprising a chamber, electric heating means in said chamber, an electric balancing system, said system including a plurality of electric resistance means, one of said resistance means being responsive to variation of temperature in said chamber, another of said resistance means determining the tempearture desired in said chamber, means in said system responsive to the difference in potential drop across said one and said other resistance means, and a motor operated voltage regulator controlling said heating means actuated by said last-named means to adjust the heat supplied by said heating means in accordance with the degree of variation of sensible heat in said chamber.

7. An apparatus of the character described, comprising oscillating means actuatable in response to current flow, a plurality of electric contact means, certain of said contact means being open and certain of said contact means being closed, means periodically engaging and moving said oscillating means, and means positioned to actuate said open and said closed contact means and adapted to be engaged by said oscillating means when said oscillating means has been moved by current flow and is moved by said periodic means.

8. An apparatus of the character described, comprising oscillating means actuatable in response to current flow, a plurality of electric contact means, certain of said contact means being open and certain of said contact means being closed, means periodically engaging and moving said oscillating means, means positioned to actuate said open and said closed contact means and adapted to be engaged by said oscillating means when said oscillating means has been moved by current flow and is moved by said periodic means, and means to hold said actuating means in actuated position.

9. An apparatus of the character described, comprising oscillating means actuatable in response to current flow, a plurality of electric contact means, certain of said contact means being open and certain of said contact means being closed, means periodically engaging and moving said oscillating means, means positioned to actuate said open and said closed contact means and adapted to be engaged by said oscillating means when said oscillating means has been moved by current flow and is moved by said periodic means, means to hold said actuating means in actuated position, and means acting periodically to release said holding means.

10. An apparatus of the character described, comprising oscillating means actuatable in response to current flow, a plurality of electric contact means, certain of said contact means being open and certain of said contact means being closed, means periodically engaging and moving said oscillating means, means positioned to actuate said open and said closed contact means and adapted to be engaged by said oscillating means when said oscillating means has been moved by current flow and is moved by said periodic means, means to hold said actuating means in actuated position, and means actuated periodically and alternately to said first-named periodic means to release said holding means.

11. An apparatus of the character described, comprising electric contact means, lever means operable to actuate said contact means, an oscillating member movable in a plane substantially parallel to said lever means, oscillating means actuatable in response to current flow and positioned to move between said lever means and said oscillating member upon current flow whereby to actuate said lever means upon engagement of said oscillating means by said oscillating member, and oscillating means operable to hold said contact means in actuated position.

12. An apparatus of the character described, comprising cooperable contact arm members having electric contacts, a lever member having means cooperable with one of said members to actuate said contacts, an oscillating member having pivotable support, means to move said oscillating member, oscillating means actuatable in response to current flow and positioned to move between said lever member and said oscillating member upon current flow whereby to actuate said lever member upon engagement of said oscillating means by said oscillating member, an oscillating member having pivotal support and means to oscillate said second-named oscillating member, said second-named oscillating member acting to hold said contacts in actuated position.

13. An apparatus of the character described, comprising cooperable contact arm members having electric contacts, a lever member having means cooperable with one of said members to actuate said contacts, an oscillating member having pivotable support, cam means to move said oscillating member, oscillating means actuatable in response to current flow and positioned to move between said lever member and said oscillating member upon current flow whereby to actuate said lever member upon engagement of said oscillating means by said oscillating member, an oscillating member having pivotal support, and cam means to oscillate said second-named oscillating member alternately with said first-named oscillating member, said second-named oscillating member acting to hold said contacts in actuated position when released by said first-named oscillating member.

14. An apparatus of the character described, comprising a balancing system including a source of electromotive force, a plurality of electric resistance members in series circuit, a resistance member responsive to temperature, a variable resistance member, said last-named resistance members being in series circuit, said circuits being connected in parallel, oscillating means responsive to current flow and being electrically connected to said variable resistance member and at a point between certain of said first-named resistance members, and screw means to vary the resistance of said variable resistance member at a substantially constant rate.

15. An apparatus of the character described, comprising an electrical balancing system having a source of electromotive force and including an electric bridge having a plurality of sets of resistance members in parallel circuit, one of said sets having a variable resistance member, another of said sets having a variable resistance member and a temperature-responsive resistance member, an oscillating means electrically connected across said variable resistance members, heating means controlled by said oscillating means, said responsive resistance member being subjected to the temperature produced by said heating means, and means predetermining the desired degree of temperature at said heating means at any instant in a given period of time, and controlling said second-named variable resistance member whereby the system acts to correct substantially instantaneously for any variation from the desired degree of temperature at said heating means.

16. An apparatus of the character described, comprising a chamber having an open-ended duct member therein spaced from the walls of said chamber, refrigerating means within said chamber operative to withdraw heat from said chamber at a substantially constant rate, electric heating means in said chamber, a balancing system operable to regulate said heating means and including means responsive to the temperature in said duct, and means to homogenize the temperature in said chamber.

17. An apparatus of the character described, comprising a chamber having an open-ended duct member therein spaced from the walls of said chamber, refrigerating means within said chamber operative to withdraw heat from said chamber at a substantially constant rate, electric heating means in said chamber, a balancing system operable to regulate said heating means and including means responsive to the temperature in said duct, fan means to homogenize the temperature of the atmosphere in said chamber, and means to indicate the velocity of flow of the atmosphere caused by said fan means.

18. An apparatus of the character described, comprising a sealed and insulated chamber having heating means and having an open-ended duct member therein and spaced from the walls thereof, an open-ended container member within said duct member and substantially coaxial therewith, said container member being adapted to receive and support a thermostatic means in operative relation to an electric switch means, and a balancing system controlled by said switch means and controlling said heating means, said balancing system including a temperature responsive resistance member positioned in said duct member and including a resistance member for predetermining the desired degree of temperature in said chamber at any given instant in a period of time.

19. The method of maintaining within a chamber a desired predetermined variation of sensible heat at predetermined increments of temperature, which comprises supplying heat to the chamber at a greater rate than the desired rate of increase, simultaneously withdrawing heat at a rate greater than the difference between the predetermined rate of increase and the rate of increase of the supplied heat, and supplying additional heat to the chamber in accordance with the heat loss from the chamber.

20. The method of maintaining within a chamber a desired predetermined variation of sensible heat at predetermined increments of temperature, which comprises supplying heat to the chamber at substantially double the desired rate of increase, simultaneously withdrawing heat at a rate greater than one-half the rate of increase of the supplied heat, and supplying additional heat to the chamber in accordance with the heat loss from the chamber.

21. The method of maintaining within a chamber a desired predetermined variation of sensible heat, which comprises supplying heat to the chamber at a greater rate than the desired rate of increase, simultaneously withdrawing heat at a rate greater than the difference between the predetermined rate of increase and the rate of increase of the supplied heat, and supplying additional heat to the chamber in accordance with the heat loss from the chamber whereby the temperature of the chamber may be decreased by substantially constant decrements by cutting off the first-named supply of heat to the chamber.

22. The method of testing the responsiveness to temperature of thermostatic means, which comprises positioning a thermostatic means to be tested within a chamber and in operative relation to an electric switch means, electrically connecting the switch means to an indicating means, and varying the sensible heat within the chamber by substantially constant increments or decrements of temperature to cause the indicating means to indicate the exact temperature at which the thermostatic means actuates the switch means.

23. The method of testing the responsiveness to temperature of thermostatic means, which comprises positioning a thermostatic means to be tested within a chamber and in operative relation to an electric switch means, electrically connecting the switch means to an indicating means, varying the sensible heat within the chamber by substantially constant increments or decrements of temperature, and homogenizing the temperature within the chamber to cause the indicating means to indicate the exact temperature at which the thermostatic means actuates the switch means.

24. The method of testing thermostatic electric switch means, which comprises positioning a thermostatic electric switch means to be tested within a sealed chamber, electrically connecting the means to recording means, and varying the sensible heat within the chamber by successive substantially constant increments and decrements of temperature under control of the switch means to cause the recording means to indicate the temperatures in a cycle of operation at which actuation of the thermostatically controlled means occurs.

25. The method of testing thermostatic electric switch means, which comprises positioning a thermostatic electric switch means to be tested within a sealed chamber, electrically connecting the means to recording means, varying the sensible heat within the chamber by successive substantially constant increments and decrements of temperature under control of the switch means to cause the recording means to indicate the temperatures in a cycle of operation at which actuation of the thermostatically controlled means occurs, and maintaining a substantially uniform flow of the atmosphere of the chamber over the thermostatic means under test.

26. An apparatus of the character described, comprising a balancing system including a source of electromotive force, a plurality of electric resistance members in series circuit, a resistance member responsive to temperature, a variable resistance member, said last-named resistance members being in series circuit, said circuits being connected in parallel, oscillating means responsive to current flow and being electrically connected to said variable resistance member and at a point between certain of said first-named resistance members, and means to vary the resistance of said variable resistance member at a substantially constant rate.

27. The method of controlling a cycle of temperature increase and decrease within a closed chamber by substantially constant increments and decrements of sensible heat, which comprises positioning within the chamber a thermostatic means operable to effect the change from increasing to decreasing temperature, supplying heat to the chamber at a greater rate than the desired rate of increase, simultaneously withdrawing heat from the chamber at a rate greater than the difference between a desired rate of change and the rate of increase of the supplied heat, supplying additional heat to the chamber, controlling the rate of supply of such additional heat in accordance with the heat loss from said chamber, and controlling the first heat supply automatically by the thermostatic means to determine the point in the cycle of temperature increase and decrease at which increasing temperature in the chamber will be changed to a decreasing temperature.

28. An apparatus for testing thermostats, comprising a sealed and insulated chamber having a heating means therein, means in said chamber operable to support a thermostatic means to be tested in operative relation to an electric switch means, refrigerating means in said chamber operable to withdraw heat from said chamber at a substantially constant rate, which rate is greater than one-half the rate at which heat is supplied by said heating means, a second heating means in said chamber operable to control the rate of temperature change in said chamber, a balancing system controlling said second-named heating means and having means responsive to the temperature in said chamber and having means cooperable with said responsive means and determining the rate of change of the heat in said chamber, said switch means being operatively connected to said first-named heating means and to said system whereby said thermostatic means is operable to control said first-named and said second-named heating means, and means controlled by said thermostatic means to record the response of said thermostatic means to the heat in said chamber.

29. An apparatus of the character described, comprising a chamber having an open-ended duct member therein spaced from the walls of said chamber, refrigerating means between said duct member and the walls of said chamber, electric heating means in said chamber, and a balancing system operable to regulate said heating means and including means responsive to the temperature in said duct.

30. An apparatus of the character described, comprising a chamber having an open-ended duct member therein spaced from the walls of said chamber, refrigerating means positioned in said chamber between the walls of said chamber and said duct member, electric heating means in said chamber and positioned between the walls of said chamber and said duct member, regulatable heating means in said chamber, and a balancing system operable to regulate said last-named heating means and including means responsive to the temperature in said duct.

31. An apparatus of the character described, comprising a chamber having an open-ended duct member therein and spaced from the walls of said chamber, an open-ended container member within said duct member, said container member being spaced from the walls of said duct member and extending substantially coaxially therewith, screen members carried by and extending across the ends of said container member whereby to decrease the velocity of flow therethrough, refrigerating means within said chamber and positioned between the walls of said chamber and said duct member, regulatable heating means in said chamber, and means to regulate said heating means.

32. In an apparatus of the character described, a closed chamber containing an endless conduit for circulation of a heat transferring medium, means in said conduit to temper the medium, a duct member in said chamber, said member having an inlet and an outlet communicating with said conduit whereby a portion of the circulating medium may be by-passed through said member, and means to decrease the rate of flow of the medium through said duct member.

33. An apparatus for maintaining within a chamber a predetermined degree of sensible heat at any given instant in a period of time, comprising heat exchange means for the chamber, regulatable heating means for the chamber, means determining the desired degree of sensible heat in the chamber, means responsive to the actual degree of sensible heat in the chamber, means to regulate the rate of heat input by said heating means, means controlling said last-named means, said controlling means being responsive to variation between the desired degree and the actual degree of sensible heat, and a thermostat in said chamber controlling the operation of said heat exchange means.

34. An apparatus for maintaining within a chamber a predetermined degree of sensible heat at any given instant in a period of time, comprising heat exchange means for the chamber, regulatable electrical heating means for the chamber, means determining the desired degree of sensible heat in the chamber, means responsive to the actual degree of sensible heat in the chamber, a voltage regulator controlling said heating means, means controlling the operation of said regulator, said controlling means being responsive to variation between the desired degree and the actual degree of sensible heat, a thermostat in said chamber, and an automatically operable means controlled by said thermostat and controlling said heat exchange means.

35. An apparatus of the character described, comprising electric contact means, lever means operable to actuate said contact means, an oscillating member movable in a plane substantially parallel to said lever means, oscillating means actuatable in response to current flow and positioned to move between said lever means and said oscillating member upon current flow whereby to actuate said lever means upon engagement of said oscillating means by said oscillating member, and means operable to hold said contact means in actuated position when said oscillating member moves away from said lever means.

DANIEL D. W_LE.